United States Patent
Abe et al.

(10) Patent No.: US 7,795,531 B2
(45) Date of Patent: Sep. 14, 2010

(54) HIGH-FREQUENCY COAXIAL CABLE

(75) Inventors: Masahiro Abe, Hitachi (JP); Hideyuki Suzuki, Hitachi (JP); Tomokazu Shibata, Hitachi (JP); Masatsugu Kuziraoka, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/088,170

(22) PCT Filed: Jun. 19, 2007

(86) PCT No.: PCT/JP2007/062311

§ 371 (c)(1),
(2), (4) Date: May 30, 2008

(87) PCT Pub. No.: WO2007/148685

PCT Pub. Date: Dec. 27, 2007

(65) Prior Publication Data

US 2009/0151970 A1    Jun. 18, 2009

(30) Foreign Application Priority Data

Jun. 20, 2006 (JP) ............................. 2006-170134
Jun. 7, 2007 (JP) ............................. 2007-151079

(51) Int. Cl.
     *H01B 11/18*     (2006.01)

(52) U.S. Cl. .................................. 174/28; 174/120 R
(58) Field of Classification Search ............. 174/28, 174/120 R, 110 F
See application file for complete search history.

(56) References Cited

FOREIGN PATENT DOCUMENTS

| JP | 56-118215 A | 9/1981 |
|---|---|---|
| JP | 8-329749 A | 12/1996 |
| JP | 2002-42555 A | 2/2002 |
| JP | 2004-339272 A | 12/2004 |
| JP | 2005-47981 A | 2/2005 |
| JP | 2005-235629 A | 9/2005 |
| JP | 2005-294244 A | 10/2005 |
| JP | 2005-302412 A | 10/2005 |
| JP | 2005-343916 A | 12/2005 |
| JP | 2006-22276 A | 1/2006 |
| JP | 2006-100160 A | 4/2006 |

*Primary Examiner*—Chau N Nguyen
(74) *Attorney, Agent, or Firm*—Foley & Lardner LLP

(57) ABSTRACT

In a high-frequency coaxial cable (1), an internal solid layer (3), an insulation layer (4) made of a foam resin, an external solid layer (5), and an external conductor (6) are provided on the periphery of an internal conductor (2) in this order. The external solid layer (5) has a dielectric dissipation factor of $1.0 \times 10^{-4}$ or less at 2 GHz. Thereby, the voltage standing-wave ratio and the attenuation of the high-frequency coaxial cable (1) are reduced.

6 Claims, 3 Drawing Sheets

HIGH-FREQUENCY COAXIAL CABLE

BACKGROUND OF THE INVENTION

1. Field of the Invention

The present invention relates to a high-frequency coaxial cable having a reduced voltage standing wave ratio and a reduced attenuation amount. The present application is based on Japanese Patent Application Nos. 2006-170134 and 2007-151079, the entire contents of which are incorporated herein by reference.

2. Related Art

A high-frequency coaxial cable 41 used in mobile communication facilities for relaying mobile phone lines and microwave communication facilities for relaying television transmission lines comprises an insulation layer 47 comprising three layers composed of an inner solid layer 43, a foamed resin insulation layer 44 and an outer solid layer 45 provided between an inner conductor 42 and an outer conductor 46, and a jacket 48 on an outer periphery of the outer conductor 46 as shown in FIGS. 4A and 4B.

In this high-frequency coaxial cable 41, a usable frequency tends to be high for the purpose of improving a communication speed and a communication capacity. Therefore, it is demanded to reduce the attenuation amount (a signal decay amount). The attenuation amount of the coaxial cable is a value which is a sum of a conductor loss due to a conductor diameter and a dielectric loss due to a material of the insulation layer 47. It is not possible to change the conductor loss, since the conductor loss is determined by a configuration of the high-frequency coaxial cable 41. Therefore, the attenuation amount is reduced by reducing the dielectric loss.

The dielectric loss is expressed by following formula (1). The dielectric loss:

$$\alpha \sqrt{\in} \times \tan \delta \times f \qquad (1),$$

wherein $\in$ is a dielectric constant, $\tan \delta$ is a dielectric tangent, and f is a frequency.

Namely, the dielectric loss is proportional to the dielectric tangent as well as the frequency. Therefore, in the high-frequency coaxial cable 41 having a high usable frequency, it is important to reduce the dielectric tangent.

When considering polyethylene as a material of the foamed resin insulation layer 44, the dielectric tangent of the high-density polyethylene (HDPE) is smaller than that of the low-density polyethylene (LDPE) because there are few side chains in the molecular configuration of the high-density polyethylene. Therefore, the high-density polyethylene is often used as a main material of the foamed resin insulation layer 44.

However, since there are few side chains in the high-density polyethylene, an entanglement between molecules is decreased, so that a melting tension (MT) is small. As a result, air bubbles in the foamed resin insulation layer 44 are independent but easily connected with each other to provide an interconnected cell.

The foamed resin insulation layer 44 is molded by extrusion by an extruder. The foamed resin insulation layer 44 extruded from the extruder is cooled to be solidified by a cooling water in a pool. At this time, the water enters in the air bubbles formed on a surface of the foamed resin insulation layer 44, so that this water enters in the foamed resin insulation layer 44 through the interconnected cell, and electrical characteristics of the high-frequency coaxial cable are deteriorated.

Therefore, in the high-frequency coaxial cable 41 shown in FIG. 4, infiltration of the water is prevented by providing the outer solid layer 45 on an outer periphery of the foamed resin insulation layer 44.

As a material of the outer solid layer 45, a low-density polyethylene or a high-density polyethylene with a high molecular mass and a density of 0.95 g/cm³ or less is used as a material having a large melting tension to press down the foamed resin insulation layer 44.

However, since the dielectric tangent is large at a high frequency in the low-density polyethylene or the high-density polyethylene with the density of 0.95 g/cm³ or less, when using these materials for the outer solid layer 45, the dielectric loss is large, so that the attenuation amount of the high-frequency coaxial cable 41 is increased.

Furthermore, in case that no inner solid layer 43 is provided, although the foaming agent is exhausted when the foamed resin insulation layer is foaming, the gas escapes to a conductor side. Furthermore, since a diameter of the foamed resin insulation layer is increased toward the outside when foaming, a clearance is generated between the conductor and the foamed resin insulation layer, so that the voltage standing wave ratio of the cable is deteriorated.

For instance, JP-A-2005-302412 discloses that no inner solid layer is provided, a thickness of the outer solid layer is 0.3 mm or less, a melting fracture tension of a material of the outer solid layer is 6 to 20 g, and a foaming degree of the foamed resin insulation layer is 78% or more. Especially in the embodiment thereof, a low-density polyethylene with large elasticity is used as a material of the outer solid layer for the purpose of preventing the outgassing of an inert gas used as the foaming agent or preventing the abnormal foaming (generation of alveolate huge bubbles), increasing the foaming degree, and reducing the attenuation amount of the high-frequency coaxial cable.

However, since the dielectric tangent of the low-density polyethylene is larger than that of the high-density polyethylene, the dielectric loss is not reduced, even though the foaming degree is increased. Therefore, it is not possible to reduce the attenuation amount of the high-frequency coaxial cable. Furthermore, the voltage standing wave ratio is deteriorated, since no inner solid layer is provided. Furthermore, when the thickness of the outer solid layer is 0.2 mm or more, it is not possible to engage an outer conductor enough with the outer solid layer, since the outer solid layer is hard.

Patent document 1, JP-A-2005-302412

As mentioned above, in the conventional high-frequency coaxial cable 41, there is a problem in such manner the inner solid layer 43 and the outer solid layer 45 are provided for satisfying the requirement to reduce the attenuation amount.

Furthermore, since the outer solid layer 45 has an original function of preventing the infiltration to the foamed resin insulation layer, it is necessary to keep the infiltration prevention when reducing the attenuation amount.

Furthermore, as the outer solid layer 45 is molded by extrusion, a molding property of the material should be good and the thickness thereof should be adjusted easily to finish up with good appearance.

Furthermore, in the inner solid layer 43, it is necessary to bond the inner conductor with the foamed resin insulation layer such that any clearances are not generated between the inner conductor and the foamed resin insulation layer.

Furthermore, the voltage standing wave ratio means an error when applying a current to the high-frequency coaxial cable. This error is generated by a generation of the interconnected cell or the infiltration of the water. Therefore, in order to improve the property of the high-frequency coaxial cable, it is necessary to reduce the voltage standing wave ratio by preventing the generation of the interconnected cell or the infiltration of the water.

THE SUMMARY OF THE INVENTION

It is an object of the invention to solve the above mentioned problem and to provide a high-frequency coaxial cable having a reduced voltage standing wave ratio and a reduced attenuation amount.

According to one aspect of the invention, a high-frequency coaxial cable comprises:

an inner solid layer, a foamed resin insulation layer, an outer solid layer and an outer conductor sequentially formed on an outer periphery of an inner conductor, wherein the outer solid layer has a dielectric tangent of $1.0 \times 10^{-4}$ or less at 2 GHz.

The outer solid layer may have a thickness of 0.1 mm to 0.2 mm.

The outer solid layer may comprise a high-density polyethylene.

The outer solid layer may comprise a material with a density of 0.960 g/cm³ or more and a melt flow rate of 5 to 10 g/min.

The outer solid layer may comprise a material with a melting fracture tension of 10 to 50 mN, which is measured by using a capillary rheometer with a furnace body diameter of 9.55 mm under a condition of using a flat capillary with an inner diameter of 2.095 mm and a length of 8.03 mm with a piston speed of 10 mm/min at a temperature of 190° C. and a draw acceleration of 400 m/min².

The foamed resin insulation layer may comprise 0.001 to 0.2 parts by weight of 4,4'-oxybisbenzenesulfonylhydrazide (OBSH) or azodicarbon amide (ADCA), or 0.001 to 0.2 parts by weight in total of both materials as a bubble nucleation agent, per 100 parts by weight of a resin as a main material.

The foamed resin insulation layer may contain an inert gas such as nitrogen or carbon dioxide gas solely or a mixed gas thereof as a foaming agent.

A foaming degree of the foamed resin insulation layer may be 70% or more.

As a resin composition of the inner solid layer, it is possible to use a composite of a low density polyethylene and an ultralow density polyethylene having a density lower than that of the low density polyethylene which is graft-copolymerized with a maleic anhydride. Furthermore, the ultralow density polyethylene which is graft-copolymerized with the maleic anhydride may comprise an ultralow density polyethylene which is graft-copolymerized with 0.5 to 5% of the maleic anhydride.

Furthermore, it is preferable that the inner solid layer comprises a composite of 5 to 50 parts by weight of an ultralow density polyethylene with a density of 0.920 g/cm³ or less and 90-50 parts by weight of a low density polyethylene with a density of 0.925 to 0.930 g/cm³.

BRIEF DESCRIPTION OF THE DRAWINGS

Next, the present invention will be explained in more detail in conjunction with appended drawings, wherein.

DESCRIPTION OF THE PREFERRED EMBODIMENTS

Figure 1A:
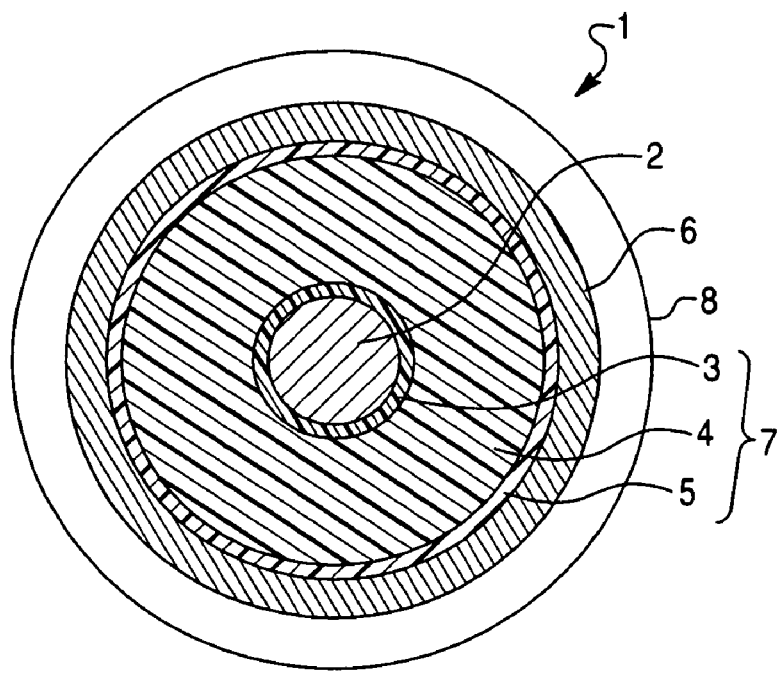
FIG. 1A is a cross sectional view showing a high-frequency coaxial cable in a preferred embodiment according to the present invention and FIG. 1B is a side view showing an end portion of the high-frequency coaxial cable.
Figure 1B:
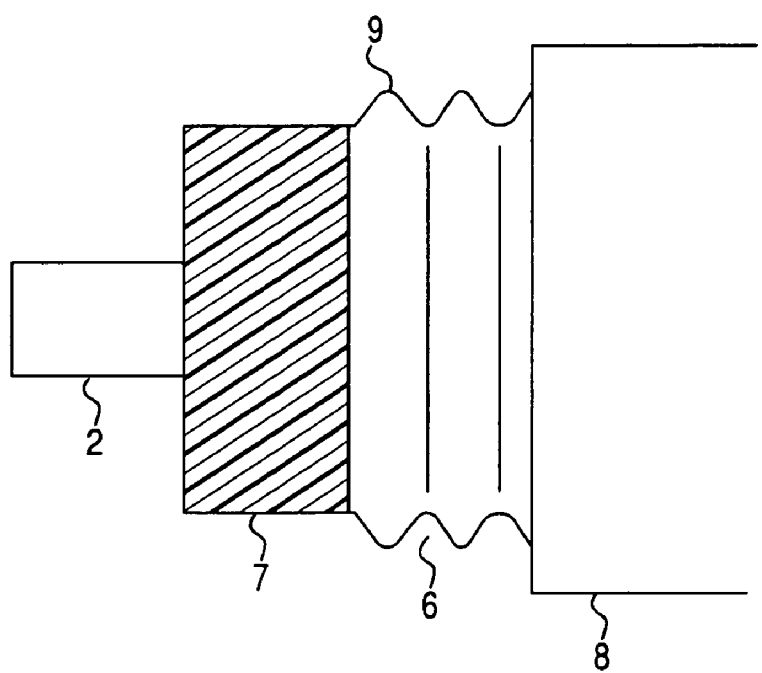

Preferred embodiment according to this invention will be explained in more detail in conjunction with FIG. 1.

A high-frequency coaxial cable 1 according to the present invention comprises an inner solid layer 3, a foamed resin insulation layer 4, an outer solid layer 5 and an outer conductor 6 sequentially provided on an outer periphery of an inner conductor 2, in which the outer solid layer 5 has a dielectric tangent of $1.0 \times 10^{-4}$ or less at 2 GHz that is measured by a cavity resonator perturbation method. The inner solid layer 3, the foamed resin insulation layer 4, and the outer solid layer 5 are called as an insulation layer 7. A jacket 8 is provided on an outer periphery of the outer conductor 6.

The inner conductor comprises a copper pipe.

The outer conductor 6 is formed in a ring shape by using a corrugated copper.

It is preferable that the dielectric tangent of the outer solid layer 5 is measured by the cavity resonator perturbation method.

The outer solid layer 5 has a thickness of 0.1 to 0.2 mm.

The outer solid layer 5 comprises a high-density polyethylene.

A material constituting the outer solid layer 5 has a density of 0.960 g/cm³ or more and a melt flow rate of 5 to 10 g/min. The melt flow rate is measured at a temperature of 190° C. and a load of 21.8N according to a standard of JIS K7210.

The material constituting the outer solid layer 5 has a melting fracture tension of 10 to 50 mN, which is measured by using a capillary rheometer with a furnace body diameter of 9.55 mm under a condition of using a flat capillary with an inner diameter of 2.095 mm and a length of 8.03 mm with a piston speed of 10 mm/min at a temperature of 190° C. and a draw acceleration of 400 m/min².

The foamed resin insulation layer 4 comprises 0.001 to 0.2 parts by weight of 4,4'-oxybisbenzenesulfonylhydrazide (OBSH) or azodicarbon amide (ADCA), or 0.001 to 0.2 parts by weight in total of both materials as a bubble nucleation agent, per 100 parts by weight of a resin as a main material.

In the foamed resin insulation layer 4, an inert gas such as nitrogen or carbon dioxide gas solely or a mixed gas thereof is used as a foaming agent.

A foaming degree of the foamed resin insulation layer 4 is 70% or more. The foaming degree of the foamed resin insulation layer 4 is calculated from following formula (2).

$$\text{Foaming degree}(\%) = 100 - (\text{specific gravity after foaming/specific gravity before foaming}) \times 100 \quad (2)$$

It is preferable that the specific gravities before and after foaming are measured for instance by using an automatic gravimeter D-H-100 manufactured by Toyo Seiki Seisakusho, Ltd., according to a standard of JIS Z8807.

Next, an apparatus for manufacturing the high-frequency coaxial cable 1 according to the present invention will be explained.

Figure 2:
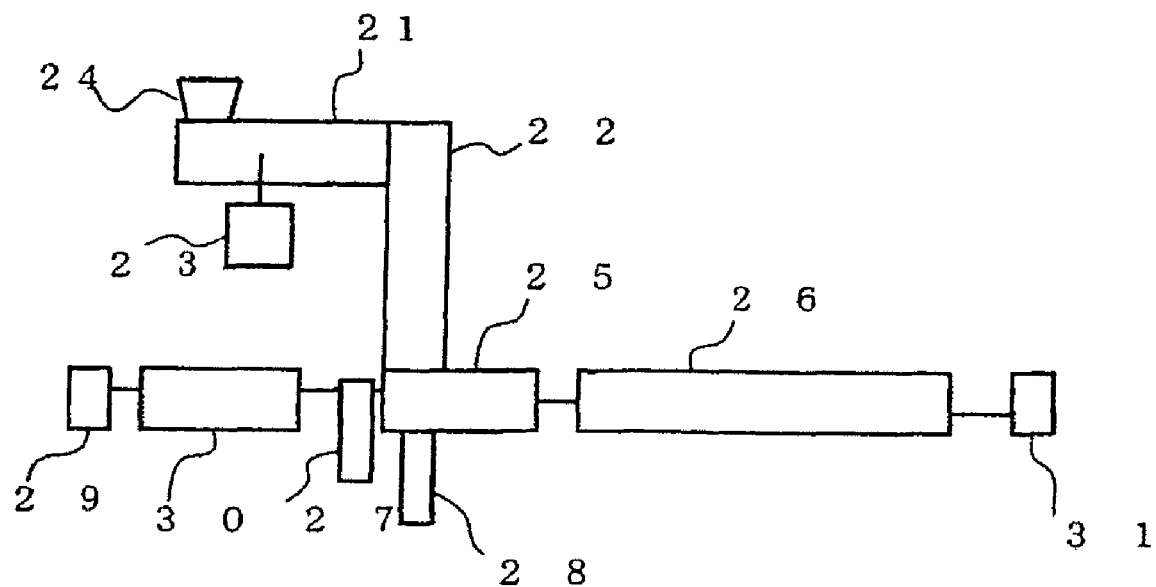
FIG. 2 is a schematic diagram showing a main part of a manufacturing apparatus used for manufacturing the high-frequency coaxial cable of FIG. 1.

FIG. 2 shows the apparatus for manufacturing the high-frequency coaxial cable 1 according to the present invention except a part where the outer conductor 6 and the jacket 8 are provided.

As shown in FIG. 2, the apparatus for manufacturing the high-frequency coaxial cable 1 comprises a first extruder 21 for kneading a foaming compound and an inert gas, a second extruder 22 for cooling the kneaded compound to a temperature suitable for foaming, a gas injector 23 for injecting the inert gas into the first extruder 21, a hopper 24 for supplying the foaming compound to the first extruder 21, an extruding head 25 for forming the foamed resin insulation layer 4 on a semi-manufactured product in which the inner solid layer 3 is already formed, a cooling water pool 26 for cooling the semi-manufactured product in which the outer solid layer 5 is already formed, an inner solid layer extruder 27 for forming the inner solid layer 3 on the inner conductor 2, an outer solid layer extruder 28 mounted integrally with the extruding head 25 for forming the foamed resin insulation layer 4 and the outer solid layer 5 simultaneously, a feeder 29 to send the inner conductor 2, a drawing machine 30 for drawing the inner conductor 2 and, a winder 31 for winding the high-frequency coaxial cable 1.

In a process prior to the process using the manufacturing apparatus of FIG. 2, a nucleation agent master batch is manufactured by kneading bubble nucleation agent with a low-density polyethylene, and the nucleation agent master batch thus manufactured is added to a compound of a low-density polyethylene and a high-density polyethylene and dry-blended to manufacture a foaming compound. The foaming compound contains 0.005 parts by weight of the bubble nucleation agent per 100 parts by weight of the resin. However, the bubble nucleation agent is not mixed at a low ratio of 0.005 parts by weight per 100 parts by weight of the resin from the very beginning. After manufacturing the nucleation agent master batch, in which a ratio of the bubble nucleation agent is 10 to 100 times of the ratio of the bubble nucleation agent in the foaming compound, the nucleation agent master batch thus manufactured is added to another resin to provide the foaming compound.

This foaming compound is supplied to the first extruder 21 via the hopper 24. The inert gas is injected to the first extruder 21 from the gas injector 23, and the kneading step is conducted in the first extruder 21. In the second extruder 22, the kneaded compound is cooled to the temperature suitable for foaming.

On the other hand, in the inner solid layer extruder 27, the inner solid layer 3 is formed on the inner conductor 2, and the semi-manufactured product thus manufactured is provided to the extruding head 25.

In the extruding head 25 and the outer solid layer extruder 28, the inner conductor 2 with a diameter of φ 9.0 mm is coated by the inner solid layer 3 in advance, and the foamed resin insulation layer 4 and the outer solid layer 5 are extruded simultaneously to coat this coated inner conductor 2. As a material of outer solid layer 5 to be supplied to the outer solid layer extruder 28, HDPE6944N may be used (see the Table 1).

In the cooling water pool 26, the semi-manufactured product in which the outer solid layer 5 is already formed is cooled. The cooled semi-manufactured product is provided with the outer conductor 6 and the jacket 8 by a well-known and common method to provide the high-frequency coaxial cable 1. A 20D annular, which is often used in general and an attenuation amount thereof is largest, is installed on the high-frequency coaxial cable 1 thus manufactured, so as to manufacture the high-frequency coaxial cable 1. Herein, the "annular" means an annular ring 9 shown in FIG. 1B. 20 indicates an inner diameter of the annular ring 9 and D indicates an impedance of 50Ω. The outer conductor 6 comprises a plurality of the annular rings 9.

Next, a function and an effect of the high-frequency coaxial cable 1 according to the present invention will be explained.

The outer solid layer 5 has a small dielectric tangent value of $1.0 \times 10^{-4}$ or less at 2 GHz, which is the usable frequency of the high-frequency coaxial cable 1. Therefore, in this high-frequency coaxial cable 1, the dielectric loss and the attenuation amount are small.

It is preferable that a thickness of the outer solid layer 5 is 0.1 mm or more, since a minimum thickness for preventing the infiltration of the water is 0.1 mm. As a result, it is possible to prevent the infiltration of the water into this high-frequency coaxial cable 1. Meanwhile, when the thickness of the outer solid layer 5 is more than 0.2 mm, the foaming degree of the foamed resin insulation layer 4 is decreased, and furthermore, it is not possible to engage the outer conductor 6 enough with the outer solid layer 5. Therefore, it is preferable that the thickness of the outer solid layer 5 is 0.2 mm or less.

The outer solid layer 5 comprises the high-density polyethylene.

The high-density polyethylene that is a material constituting the outer solid layer 5 has a density of 0.960 g/cm$^3$ or more and a melt flow rate of 5 to 10 g/min. Although the high-density polyethylene with the density of 0.960 g/cm$^3$ or more has a melting tension smaller than that of the low-density polyethylene of 0.95 g/cm$^3$ or less, it is possible to manufacture the high-frequency coaxial cable 1 with good appearance, since it is possible to obtain an excellent electrical property as well as good molding property by using the high-density polyethylene.

The material constituting the outer solid layer 5 has a melting fracture tension of 10 to 50 mN, which is measured by using a capillary rheometer with a furnace body diameter of 9.55 mm under a condition of using a flat capillary with an inner diameter of 2.095 mm and a length of 8.03 mm with a piston speed of 10 mm/min at a temperature of 190° C. and a draw acceleration of 400 m/min$^2$. This melting fracture tension corresponds to 1 to 5 g. It is possible to adjust the thickness of the outer solid layer 5 easily by using such a high-density polyethylene.

The formed resin insulation layer 4 comprises 0.001 to 0.2 parts by weight of the OBSH or the ADCA, or 0.001 to 0.2 parts by weight in total of both materials as the bubble nucleation agent, per 100 parts by weight of the resin as the main material. It is not possible to obtain a nucleation agent effect, when an additive amount is less than 0.001 parts by weight. However, it is possible to obtain the nucleation agent effect, since the additive amount is more than 0.001 parts by weight in the present invention. Furthermore, although the dielectric tangent tan δ is increased, when the additive amount is more than 0.2 parts by weight, the dielectric tangent tan δ is not increased, since the additive amount is less than 0.2 parts by weight in the present invention.

In the foamed resin insulation layer 4, the inert gas such as nitrogen or carbon dioxide gas solely or the mixed gas thereof is used as the foaming agent. Foam formation is classified into a chemical foaming and a physical foaming. The chemical foaming is generated by a decomposed gas, so that decomposed residues are left. These decomposed residues cause deterioration of the electrical characteristics of the high-frequency coaxial cable. The physical foaming is classified into foam formation by chlorofluorocarbon gas, foam formation by hydrocarbon gas, and foam formation by the inert gas. It is not possible to use the chlorofluorocarbon gas from the viewpoint of environmental conservation, and it is not preferable to use the hydrocarbon gas due to its inflammability, so that the most preferable foaming method is a method using the inert gas.

The foaming degree of the foamed resin insulation layer is 70% or more. According to this structure, it is possible to obtain an effect of decreasing the permittivity and the dielectric tangent tan.

Figure 3:
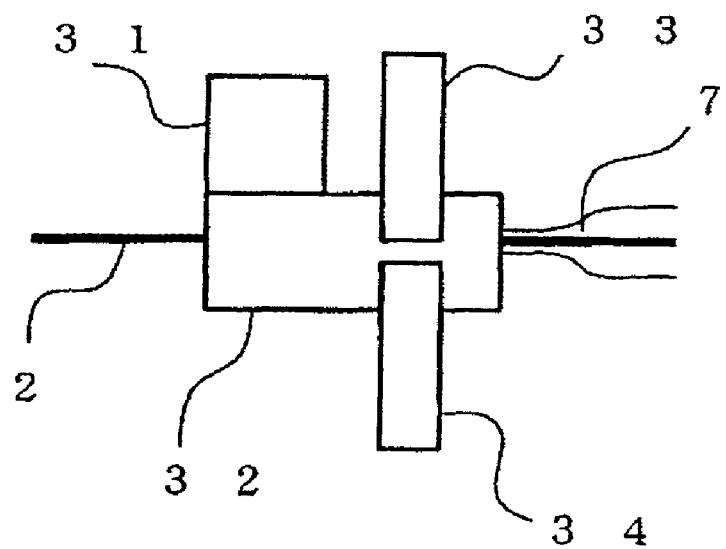
FIG. 3 is a schematic configuration diagram showing a main part of another manufacturing apparatus used for manufacturing the high-frequency coaxial cable of FIG. 1.
Figure 4A:
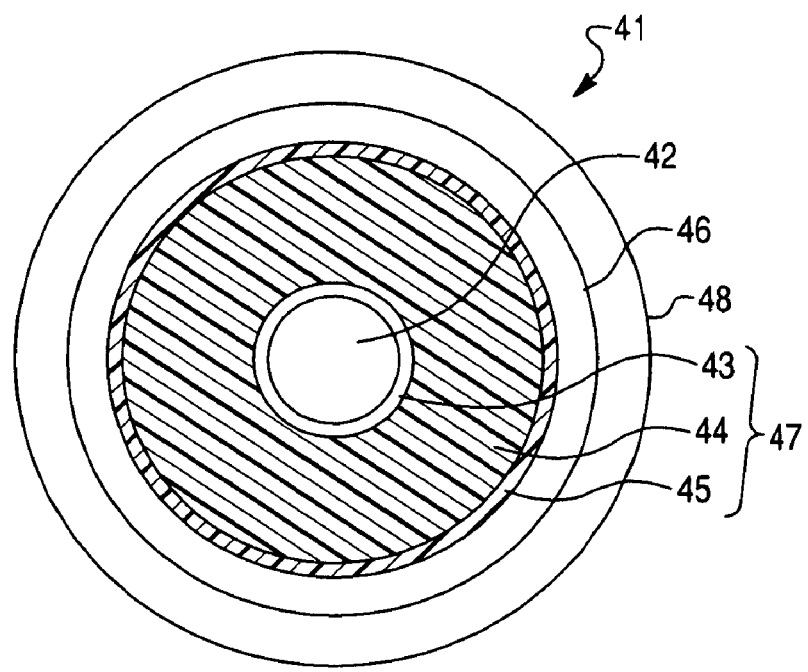
FIG. 4A is a cross sectional view showing a conventional high-frequency coaxial cable and FIG. 4B is a side view showing an end portion of the conventional high-frequency coaxial cable.
Figure 4B:
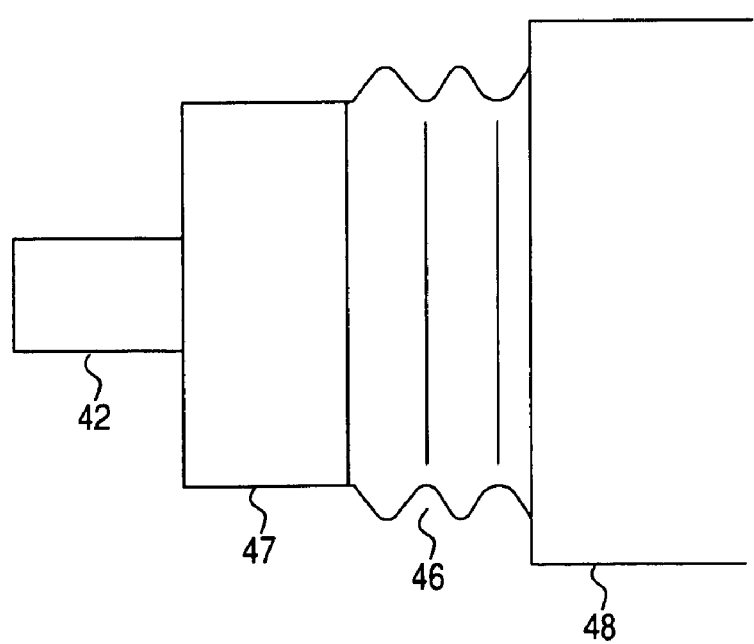

FIG. 3 shows another apparatus for manufacturing the high-frequency coaxial cable 1 according to the present invention.

As shown in FIG. 3, the apparatus for manufacturing the high-frequency coaxial cable 1 comprises a second extruder 32 for extruding the foamed resin insulation layer 4, a second extruder head 33 which is an extruding head of the second extruder 32, an inner solid layer extruder 34 installed in the second extruder head 33 for extruding the inner solid layer 3, and an outer solid layer extruder 35 similarly installed in the second extruder head 33 for extruding the outer solid layer 5.

In this manufacturing apparatus, the inner conductor 2 is supplied to the second extruder head 33 and the insulation layer 7 is molded in block by the second extruder head 33 by extruding the inner solid layer 3, the foamed resin insulation layer 4, and the outer solid layer 5 simultaneously.

EMBODIMENT

TABLE 1

| | | Material | Embodiment 1 | Embodiment 2 | Embodiment 3 | Embodiment 4 | Embodiment 5 | Comparative Example 1 |
|---|---|---|---|---|---|---|---|---|
| Composition | Foamed resin Insulation layer | HDPE 6944N[1] | 85 | 85 | 85 | 85 | 85 | 85 |
| | | LDPE B028[2] | 15 | 15 | 15 | 15 | 15 | 15 |
| | | nucleation agent ADCA | 0.005 | 0.005 | 0.005 | 0.005 | 0.005 | 0.005 |
| | Outer solid layer | 6944N | 100 | — | — | 100 | 100 | — |
| | | 2500[3] | — | 100 | — | — | — | — |
| | | 2070[4] | — | — | 100 | — | — | — |
| | | 130J[5] | — | — | — | — | — | 100 |
| | | 210JZ[6] | — | — | — | — | — | — |
| | | 232J[7] | — | — | — | — | — | — |
| Property of outer solid layer | | Density (g/cm$^3$) | 0.965 | 0.963 | 0.962 | 0.965 | 0.965 | 0.962 |
| | | MFR (g/10 min) | 8.0 | 5.0 | 8.0 | 8.0 | 8.0 | 12.0 |
| | | tan δ (2 GHz × 10$^{-4}$) | 0.6 | 0.9 | 1 | 0.6 | 0.6 | 0.95 |
| | | Thickness (mm) | 0.15 | 0.2 | 0.17 | 0.1 | 0.2 | 0.05 |
| | | Melting fracture tension (190° C. · mN) | 10 | 45 | 15 | 10 | 10 | 2 |
| Property of Foamed resin insulation layer | | Foaming degree (%) | 76 | 74 | 76 | 76 | 74 | 73 |
| | | Infiltration of the water | No | No | No | No | No | Yes |
| Inner solid layer | | Presence of the inner solid layer | Yes | Yes | Yes | Yes | Yes | Yes |
| Property of cable | | VSWR (passed at 1.1 or less) | 1.05 | 1.05 | 1.05 | 1.05 | 1.05 | 1.1 |
| | | Attenuation amount at 2.2 GHz (passed at 6.5 dB/100 m or less) | Passed | Passed | Passed | Passed | Passed | Failed |

| | | Material | Comparative Example 2 | Comparative Example 3 | Comparative Example 4 | Comparative Example 5 | Comparative Example 6 |
|---|---|---|---|---|---|---|---|
| Composition | Foamed resin Insulation layer | HDPE 6944N[1] | 85 | 85 | 85 | 85 | 85 |
| | | LDPE B028[2] | 15 | 15 | 15 | 15 | 15 |
| | | nucleation agent ADCA | 0.005 | 0.005 | 0.005 | 0.005 | 0.005 |
| | Outer solid layer | 6944N | — | — | 100 | 100 | 100 |
| | | 2500[3] | — | — | — | — | — |
| | | 2070[4] | — | — | — | — | — |
| | | 130J[5] | — | — | — | — | — |
| | | 210JZ[6] | 100 | — | — | — | — |
| | | 232J[7] | — | 100 | — | — | — |
| Property of outer solid layer | | Density (g/cm$^3$) | 0.965 | 0.958 | 0.965 | 0.965 | 0.965 |
| | | MFR (g/10 min) | 4.7 | 5.0 | 8.0 | 8.0 | 8.0 |
| | | tan δ (2 GHz × 10$^{-4}$) | 0.8 | 1.2 | 0.6 | 0.6 | 0.6 |
| | | Thickness (mm) | 0.3 | 0.2 | 0.05 | 0.25 | 0.25 |
| | | Melting fracture tension (190° C. · mN) | 70 | 50 | 10 | 10 | 10 |
| Property of Foamed resin insulation layer | | Foaming degree (%) | 69 | 76 | 74 | 69 | 74 |
| | | Infiltration of the water | No | No | Yes | No | No |
| Inner solid layer | | Presence of the inner solid layer | Yes | Yes | Yes | Yes | No |
| Property of cable | | VSWR (passed at 1.1 or less) | 1.05 | 1.05 | 1.1 | 1.05 | 1.15 |
| | | Attenuation amount at 2.2 GHz (passed at 6.5 dB/100 m or less) | Failed | Failed | Failed | Failed | Failed |

[1]Nippon Unicar Co., Ltd. (Density: 0.965 g/cm$^3$, MFR: 8.0 g/10 min)
[2]Ube Maruzen Polymer Co., Ltd. (Density: 0.928 g/cm$^3$, MFR: 0.5 g/10 min)
[3]Ube Maruzen Polymer Co., Ltd. (Density: 0.963 g/cm$^3$, MFR: 5.0 g/10 min)
[4]Ube Maruzen Polymer Co., Ltd. (Density: 0.962 g/cm$^3$, MFR: 8.0 g/10 min)
[5]Prime Polymer Co., Ltd. (Density: 0.962 g/cm$^3$, MFR: 12.0 g/10 min)
[6]Prime Polymer Co., Ltd. (Density: 0.965 g/cm$^3$, MFR: 4.7 g/10 min)
[7]Prime Polymer Co., Ltd. (Density: 0.968 g/cm$^3$, MFR: 5.0 g/10 min)

As shown in Table 1, embodiments 1 to 5 and comparative examples 1 to 6 were manufactured and tested. Materials used for the foamed resin insulation layer 4 are HDPE 6944N, LDPE B028 and a bubble nucleation agent ADCA. Materials used for the outer solid layer 5 are 6944N, 2500, 2070, 130J, 210JZ and 232J which are all HDPE. The manufacturer's names of respective materials are mentioned in a margin of the table. The properties of the respective materials are mentioned in column of the property of the outer solid layer 5.

Each of the embodiments 1 to 5 and the comparative examples 1 to 6 were manufactured by a manufacturing method mentioned below using the manufacturing apparatus of FIG. 2. The embodiments 1 to 5 meet the requirements of the present invention, while the comparative examples 1 to 6 do not meet the requirements partially.

A nucleation agent master batch was manufactured by kneading the bubble nucleation agent with the low-density polyethylene such that a concentration of the bubble nucleation agent is 10 to 100 times of that of the bubble nucleation agent in the foaming compound. The nucleation agent master batch is added to a composite of the low-density polyethylene and the high-density polyethylene and dry-blended, such that the concentration of the bubble nucleation agent is 0.005 parts by weight, to provide the foaming compound.

This foaming compound is supplied to the first extruder 21 via the hopper 24. The inert gas is injected to the first extruder 21 from the gas injector 23, and the kneading process is conducted in the first extruder 21. In the second extruder 22, the kneaded compound is cooled to the temperature suitable for foaming.

Meanwhile, in the inner solid layer extruder 27, the inner solid layer 3 is formed on the inner conductor 2, and the semi-manufactured product is provided to the extruding head 25.

In the extruding head 25 and the outer solid layer extruder 28, the inner conductor 2 with a diameter of φ 9.0 mm is coated by the inner solid layer 3 in advance, and the foamed resin insulation layer 4 and the outer solid layer 5 are extruded simultaneously to coat this coated inner conductor 2.

The 20D annular having the largest attenuation amount is installed on the high-frequency coaxial cable thus manufactured, to provide the high-frequency coaxial cable 1.

The attenuation amount and the voltage standing wave ratio (VAWR) of the high-frequency coaxial cable in each of the embodiments 1 to 5 and the comparative example 1 to 5 were measured and evaluated. For the measurement, a scalar network analyzer 8757D fabricated by Agilent Technologies was used, and the test was assumed to be success when the attenuation amount at 2.2 GHz was less not more than 6.5 dB/100 m and the VSWR was 1.1 or less.

The foaming degree of the foamed resin insulation layer 4 was calculated by the formula (2).

The melt flow rate was measured at the temperature of 190° C. with the load of 21.8N according to the standard of JIS K7210.

The evaluation result will be explained below.

In the embodiments 1 to 5, the value of the dielectric tangent tan δ of the outer solid layer 5 at 2 GHz is $1.0\times10^{-4}$ or less, and the thickness is 0.1 to 0.2 mm. The embodiments 1 to 5 passed the test of the attenuation amount as well as the VSWR. No infiltration of the water was also confirmed.

In the comparative example 1, the thickness of the outer solid layer 5 is 0.05 mm, which is less than 0.1 mm. As for the comparative example 1, the water entered into the foamed resin insulation layer 4. Furthermore, the bubbles were coarsened by discharging the foaming agent (outgassing) and the foaming degree falls to 74%. As a result, the attenuation amount fails the test.

In the comparative example 2, the thickness of the outer solid layer 5 is more than 0.2 mm. As for the comparative example 2, the attenuation amount fails the test, since the foaming degree of the foamed resin insulation layer 4 is decreased. Furthermore, since the outer solid layer 5 is thick, it is not possible to engage the outer conductor enough with the outer solid layer 5.

In the comparative example 3, the density of the material constituting the outer solid layer 5 is less than 0.960 g/cm³. As a result, the value of dielectric tangent in the comparative example 3 is more than $1.0\times10^{-4}$ and the attenuation amount fails the test.

In the comparative example 4, the thickness of the outer solid layer 5 is less than 0.1 mm. As for the comparative example 4, the water entered into the foamed resin insulation layer 4, as a result, the attenuation amount fails the test.

In the comparative example 5, the thickness of the outer solid layer 5 is more than 0.2 mm. As for the comparative example 5, the attenuation amount fails the test, since the foaming degree of the foamed resin insulation layer 4 is decreased. Furthermore, since the outer solid layer 5 is thick, it is not possible to engage the outer conductor 6 enough with the outer solid layer 5.

The comparative example 6 shows a case that no inner solid layer is provided. Since a clearance is generated between the inner conductor 2 and the foamed resin insulation layer 4, the VSWR fails the test. Furthermore, it is not possible to realize the high forming since the inert gas which is the foaming agent leaks to the inner conductor side, and the attenuation amount also fails the test.

INDUSTRIAL APPLICABILITY

The high-frequency coaxial cable according to the present invention has the reduced voltage standing wave ratio and the reduced attenuation amount. As a result, it is possible to address enough to the tendency of increasing the usable frequency, for the purpose of improving the communication speed and the communication capacity.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A high-frequency coaxial cable comprising:
   an inner solid layer, a foamed resin insulation layer, an outer solid layer and an outer conductor sequentially formed on an outer periphery of an inner conductor,
   wherein the outer solid layer comprises a high-density polyethylene with a density of 0.960 g/cm³ or more and a melt flow rate of 5 to 10 g/min, and a melting fracture tension of 10 to 50 mN, which is measured by using a capillary rheometer with a furnace body diameter of 9.55 mm under a condition of using a flat capillary with an inner diameter of 2.095 mm and a length of 8.03 mm with a piston speed of 10 mm/min at a temperature of 190° C. and a draw acceleration of 400 m/min², and
   wherein the outer solid layer has a thickness of 0.1 mm to 0.2 mm, and a dielectric tangent of $1.0\times10^{-4}$ or less at 2 GHz.

2. The high-frequency coaxial cable according to claim 1, wherein the foamed resin insulation layer comprises 0.001 to 0.2 parts by weight of 4,4'-oxybisbenzenesulfonylhydrazide (OBSH) or azodicarbon amide (ADCA), or 0.001 to 0.2 parts by weight in total of both materials as a bubble nucleation agent, per 100 parts by weight of a resin as a main material.

3. The high-frequency coaxial cable according to claim 1, wherein the foamed resin insulation layer contains an inert gas such as nitrogen or carbon dioxide gas solely or a mixed gas thereof as a foaming agent.

4. The high-frequency coaxial cable according to claim 1, wherein a foaming degree of the foamed resin insulation layer is 70% or more.

5. The high-frequency coaxial cable according to claim 1, wherein the inner solid layer comprises a composite of a low density polyethylene and an ultralow density polyethylene having a density lower than that of the low density polyethylene which is graft-copolymerized with a maleic anhydride.

6. The high-frequency coaxial cable according to claim 2, wherein the foamed resin insulation layer contains an inert gas such as nitrogen or carbon dioxide gas solely or a mixed gas thereof as a foaming agent.

* * * * *